United States Patent
Koshar et al.

[11] 3,758,555
[45] Sept. 11, 1973

[54] DIFLUOROAMINO COMPOUNDS

[75] Inventors: Robert J. Koshar, Lincoln Township, Washington County; Donald R. Husted, St. Paul; Charles D. Wright, White Bear Lake; Joseph La Mar Zollinger, Woodbury Township, Washington County, all of Minn.

[73] Assignee: Minnesota Mining and Manufacturing Company, St. Paul, Minn.

[22] Filed: Jan. 8, 1965

[21] Appl. No.: 425,113

[52] U.S. Cl. ........ 260/482 R, 149/109, 260/239 BE, 260/248 NS, 260/250 R, 260/296 R, 260/308 D, 260/309, 260/326.5 J, 260/347.7, 260/349, 260/397.2, 260/397.3, 260/453 AL, 260/465 E, 260/465.5 R, 260/482 C, 260/488 CD, 260/488 F, 260/488 H, 260/534 M, 260/551 R, 260/556 AR, 260/561 A, 260/563 R, 260/564 R, 260/566 AE, 260/573, 260/578, 260/583 NH, 260/584 R, 260/584 C, 260/944

[51] Int. Cl. .......................................... C07c 101/00
[58] Field of Search.................... 260/482, 534, 561, 260/583, 584, 349, 453 AL, 465.5 R, 482 R, 482 C, 534 M, 561 A, 583 NH, 584 R, 584 C

[56] References Cited
UNITED STATES PATENTS

| | | | |
|---|---|---|---|
| 3,405,143 | 10/1968 | Meyers et al. | 260/349 |
| 3,461,162 | 8/1969 | Koshar et al. | 260/564 |
| 3,574,710 | 4/1971 | Coleman et al. | 260/482 |
| 3,654,341 | 4/1972 | Koshar | 260/465.5 R |
| 3,654,361 | 4/1972 | Dybvig et al. | 260/561 A |

OTHER PUBLICATIONS
Webster's Third New International Dictionary of the English Language Unabridged, Merrian Co., Springfield, Mass. 1965, p. 335.

Primary Examiner—Leland A. Sebastian
Attorney—Frank A. Steldt, Donald C. Gipple and Temple Clayton

EXEMPLARY CLAIM

1. A compound of the formula $$R_B-C(NF_2)_3$$

wherein $R_B$ is a member of the group consisting of polyfluoroalkyl radicals of from one to 18 carbon atoms and hydrocarbon radicals having from one to 30 carbon atoms, said radicals being free from reducing substitutents.

7 Claims, No Drawings

DIFLUOROAMINO COMPOUNDS

This invention relates to a new class of fluorine-containing organic compounds and more particularly to organic compounds containing the novel tris(difluoramino)methyl functional group and to methods for their synthesis.

It is an object of this invention to provide a novel and useful class of fluorine-containing compounds and methods for their synthesis.

A further object of the invention is to provide a new class of organic oxidants having in common at least one functional group consisting of three difluoramino groups attached to a single carbon atom.

Other objects of the invention will be apparent from the disclosures made hereinafter.

In accordance with the above and other objects of this invention there has been discovered a new class of difluoramino compounds. The new class of compounds can be represented by the formula:

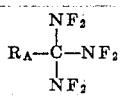

wherein $R_A$ is an organic radical, an element or an inorganic radical which is free from reducing substituents and which is bonded to the carbon atom of the tris(difluoramino)methyl moiety. Thus, the tris(difluoramino)methyl group is covalently bonded to the remainder of the molecule.

Hereinafter, the new functional group is referred to as the tris(difluoramino)methyl group, and the compounds of the invention are designated generally as the tris(difluoramino)methyl compounds.

The group $R_A$ to which the tris(difluoramino)methyl group is attached can be a hydrocarbon, heterocyclic or aromatic group, or a combination thereof. These can be aliphatically saturated or unsaturated; aliphatic, such as alkyl and alkenyl, or cyclo aliphatic, aryl, alkaryl or aralkyl. Substituents other than the tris(difluoramino)methyl group which can be present on the $R_A$ group vary widely and are required only to be compatible with the said new functional group. The only known noncompatible substituent groups are those which are strongly reducing in nature.

A criterion for determining the compatibility of functionally reducing substituents of $R_A$ is the single electrode potential of the oxidation-reduction couple of which the substituent in the reduced form as measured against a normal hydrogen electrode. Using this convention, the single electrode potential of the iodide to iodine couple is −0.53 volts. Compatible substituents of this type include those which have measured or calculated potentials more negative than −0.6 volts, under the conditions in which the tris(difluoramino)methyl group-containing compounds are manipulated. On the other hand, substituents of this type which would normally have a potential less negative than −0.6 volts (say up to +0.5 volts or even higher) will be compatible with the presence of the tris(difluoramino)methyl group when the temperature of preparation, or the solvent used; or the physical state of the final product, are such that the kinetics of decomposition control the rate to an acceptable degree.

Illustrative of these strongly reducing groups are those which contain reactive metal to carbon and metal to hydrogen bonds; pi-bonded metallo-organic moieties; ionically bonded iodide, sulfide and polysulfide; polyhydroxy groups in aromatic nuclei; and inorganic groups which contain trivalent phosphorous, monovalent copper, or any element above atomic number 22 in a reduced valence state.

All other organic and inorganic functional groups commonly known to the art can be present in the compounds of this invention which contain the tris(difluoramino)methyl functional group. The $R_A$ groups, or example, may contain unsaturation such as between carbon and carbon, carbon and nitrogen, and carbon and oxygen, and may contain known functional groups or linkages such as hydroxy, azo, azoxy, cyanato, carboxy, amino, imino, cyano, halogeno, tetrazolyl, alkoxy, alkylthio, oxo, nitroso, amido, sulfonamido, sulfonyl, ureido and the like as well as oxidizing groups such as nitro, difluoramino, fluorimino, chloramino, peroxy and the like.

Some illustrative compounds of the invention are as follows:

$(F_2N)_3CC_6H_5$
$(F_2N)_3COCH_2CH_2OH$

$(F_2N)_3CO(CH_2)_3CH_3$
$(F_2N)_3COCH_2CH_2CH_2Si(CH_3)_3$
$(F_2N)_3CNH_2$
$(F_2N)_3CCF_2NF_2$
$[(F_2N)_3COCH_2]_4C$

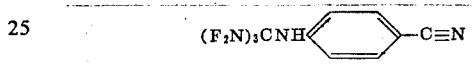

$(F_2N)_3CN=C=O$
$(F_2N)_3COCH_2CH_2NH^-_3 Cl_+$

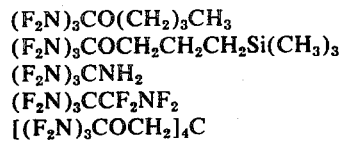

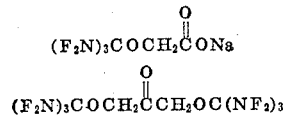

$(F_2N)_3C-CH_2Cl$
$(F_2N)_3COCH_2C_3F_7$
$(F_2N)_3CCl$
$(F_2N)_3CC_2H_5$
$(F_2N)_3COCH_2CH=CH_2$
$(F_2N)_3COCH_2CH_2OP(O)(OH)_2$

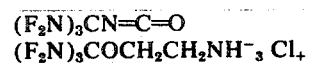

$(F_2N)_3CCH_2NH_2$

[(F₂N)₃COCH₂CH₂]₃N
(F₂N)₃CC₃F₇
C₆H₅(CH₃)C=NOC(NF₂)₃
(O₂N)₃CCH₂OC(NF₂)₃

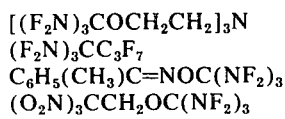

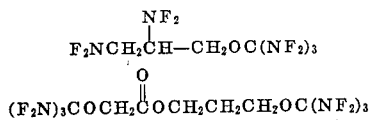

A useful subgroup of this invention is that represented by the formula

Z←X—C(NF₂)₃]ₙ wherein Z is an n-valent organic radical, having from one to 30 carbon atoms, of the group consisting of monovalent radicals including alkyl, aryl, polyhaloalkyl, polyhaloaryl, alkaryl, aralkyl, polyhaloalkaryl and polyhaloaralkyl; divalent radicals including alkylene, polyhaloalkylene, arylene, alkylarylene, polyhaloalkylarylene, arylalkylene, arylpolyhaloalkylene; multivalent radicals such as neopentanetetrayl, 1,2,2-propanetriyl and the like and heterocyclic group-containing radicals. Substituents on these radicals are subject to the reguirements set forth above. They are attached indirectly to the tris(difluoramino)methyl functional group by means of a linking group X, such as —O—, —NH—,

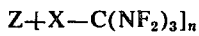

—O—O—, —N(alkyl)— (wherein the alkyl is a lower alkyl such as CH₃ and C₂H₅), —N=N—,

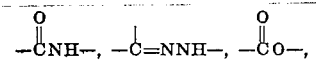

—SO₂NHO—,

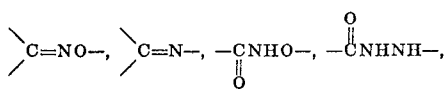

and —CH=NO—; and n is an integer equal to the valency of Z and is preferred to be from 1 to 4.

Another useful subgroup of the invention is represented by the formula

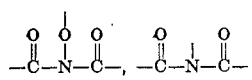

wherein R_B is an organic radical having from one to 30 carbon atoms to a carbon atom of which is attached the tris(difluoramino)methyl moiety. The substituents of R_B are subject to the requirements set forth above. The R_B group includes aliphatic hydrocarbon radicals such as ethyl, propyl, hexyl and the like; aromatic hydrocarbon radicals such as benzyl, naphthyl and phenanthryl; cyclo-aliphatic radicals such as cyclopentyl, cyclohexyl; radicals derived from heterocycles such as pyridine, diazines, diazoles, triazoles, triazines, furan and furazole; and polyfluorocarbon radicals having from one to 18 carbon atoms and at least two fluorine atoms attached to carbon. In addition to straight and branched alicyclic polyfluorinated radicals, such radicals include polyfluorinated carbocyclic and heterocyclic rings; for example, polyfluoropyridyl, polyfluorocyclohexyl, polyfluorocyclohexylethyl and the like. Also included within the scop of the term polyfluorocarbon are the completely fluorinated radicals such as perfluoromethyl, perfluorooctyl, perfluorocyclobutyl, difluoraminoperfluoromethyl, tris(difluoramino)methyl and the like as well as fluorine-containing radicals which contain other atoms in the carbon chain, e.g., oxa, aza, peroxy and the like groups.

Another interesting and useful subgroup of this invention is a compound represented by the formula

Q—C(NF₂)₃ wherein Q is an element or inorganic radical such as amino, monofluoramino, azido, isocyanato, fluoro, chloro, bromo, cyano, carbamoyl, amidino and the like attached directly to the tris(difluoramino)methyl group and likewise subject to the requirements specified above.

Several methods for the synthesis of the tris(difluoramino)methyl compounds have been discovered. Broadly speaking, these methods include:

Method 1. The nucleophilic addition of a compound containing Zerewitinoff-active hydrogen to perfluoroguanidine, (F₂N)₂C=NF, followed by fluorination of the resulting monofluoramino (NFH) containing adduct.

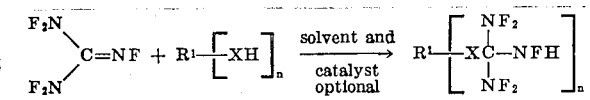

and

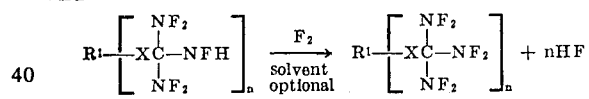

In the above formulas, R¹—XH]ₙ represents broadly an organic or inorganic compound containing Zerewitinoff-active hydrogen, wherein X is a linking radical which includes —O—, —NH—,

—OO—, —CH=NO—,

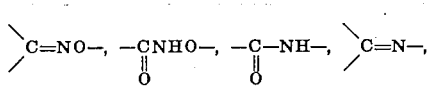

—C=NNH—,

—SO₂NHO—,

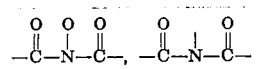

and —N(alkyl)— (in which the alkyl radical is a lower alkyl such as CH₃, C₂H₅, etc.); R¹ is hydrogen or an n-valent radical of widely varying nature; and n equals the valency of R¹.

When $R^1 + XH]_n$ is organic such as the general class of alcohols, oximes, amines and active methylene compounds, $R^1$ can be monovalent radical, for example, alkyl, polyhaloalkyl, aryl, arylalkyl and heterocyclic radicals. $R^1$ can also be a divalent or multivalent radical such as ethylene, pentamethylene, phenylene, neopentanetetrayl, 1,2,3-propanetriyl, and in such cases $R^1 + XH]_n$ contains more than one active hydrogen atom indirectly attached to $R^1$ by means of more than one linking X group. The compound containing active hydrogen may also be polymeric, e.g., such as polyvinyl alcohol.

$R^1 + XH]_n$ can also be an inorganic substance such as $HN_3$, $H_2O_2$, HNCS, $H_2NNH_2$, HNCO, $NH_3$, HF, HBr, HCl and the like. In this case, azido, isocyanato, amino, fluoro, bromo, chloro, peroxy and the like radicals are directly attached to the tris(difluoramino)methyl moiety.

Synthesis Method 1 is very general and involves two steps. The first step requires the addition of the desired compound, $R^1 + XH]_n$, containing active hydrogen, to the double bond in perfluoroguanidine to give adducts containing monofluoramino (NFH) groups. This method and other methods for the synthesis of the intermediate monofluoramino compounds are disclosed in the copending application Ser. No. 404,206.

The addition reaction is carried out in the range of about −150 to 100°C. depending upon the reactivity of the active hydrogen-containing intermediate compound and the stability of the adduct. Since the addition is ionic in nature, polar solvents such as acetonitrile, trifluoroethanol, nitromethane, ethyl acetate, methyl formate, sulfolane, dimethyl ether and polyethers can be used to advantage, but their use is not absolutely necessary. Water is generally to be avoided during the addition reaction.

When the compound containing active hydrogen is weakly nucleophilic, basic catalysts such as urea and N,N′-dimethylurea, triethylamine, sodium cyanide and the like can be used to promote the addition reaction, provided that such catalysts do not cause the complete decomposition of the mono-fluoramino-containing adduct, which can vary in stability. Some of these adducts, for example, can be isolated as solids, liquids or gases; others are unstable at room temperature and evolve $HNF_2$ to form the trifluoroformamidino compounds containing the functional group, $—C(NF_2)=NF$. The trifluoroformamidino compounds are more fully described in the copending application Ser. No. 351,581, filed Mar. 6, 1964 and they can be used as intermediates to tris(difluoramino)methyl compounds as described hereinafter. When the compound containing active hydrogen is strongly nucleophilic, such as in the case of certain amines, the addition is exothermic and cooling and dilution with appropriate solvents are advantageous. When the adduct formed is unstable as, for example, at room temperature, it need not be isolated but can be stored under refrigeration with or without solvent and treated directly by means of fluorination to give the desired tris(difluoramino)methyl compound.

The second step of synthesis Method 1 involves the replacement of the hydrogen atom of the —NFH group of the monofluoramino-containing adduct with fluorine. This is usually readily accomplished with elemental fluorine even at low temperatures with very dilute concentrations of fluorine. Because of the ease of fluorination of the —NFH group, selective fluorination to a difluoramino group without fluorination of the attached radical, $R^1$, is possible. The direct fluorination process can be conducted by a variety of methods such as the contact of elemental fluorine with a stationary or agitated bed of the said adduct or by the passage of fluorine through a solution or suspension of the said adduct. Fluorinations may be carried out under essentially atmospheric pressure using a flow system or a closed system, wherein fluorine may be recirculated, and where pressures greater than one atmosphere may be employed. Elemental fluorine is introduced as a gas either in dilute form, premixed with an inert gaseous diluent such as nitrogen or helium, or in relatively pure form. Very low concentrations of fluorine (as low as about 3 volume percent) can be used. Since reactions of fluorine are generally exothermic, the usual provisions for dissipation of heat and control of the concentration of fluorine are made. It is of course required that the reactor be composed of materials known to be inert toward fluorine under ordinary conditions such as copper, monel and the like.

The use of liquid diluents is advantageous for control of the heat of reaction and for minimizing fragmentation during the fluorination. Liquid diluents which are used include non-polar polyhalogenated compositions, inert toward fluorine under ordinary conditions, such as, for example, trichlorofluoromethane, perfluorooctane, perfluorocyclobutane, perfluorotributylamine and the like as well as polar, less inert diluents such as acetonitrile, trifluoroethanol, nitromethane and the like. The polar diluents may react at least to some extent with fluorine under ordinary conditions, but in most cases they are less reactive toward fluorine than the —NFH group of the said adduct and their use in particularly advantageous for fluorinations conducted at low temperatures with low concentration of fluorine.

Fluorination in this process is preferably carried out at temperatures in the range of about −100 to 50°C., as required by the intermediates and final products.

The tris(difluoramino)methyl compound product can be collected in cold traps during the fluorination process, or caused to remain as a residue in the reactor, or in solution when liquid diluents are used. When the desired tris(difluroamino)methyl compound is volatile and is entrained in the effluent gas stream, the hydrogen fluoride resulting from fluorination can be removed by passing the effluent gas through a hydrogen fluoride acceptor, such as a chamber containing sodium fluoride pellets or the like, usually maintained at ambient temperature. It is to be noted that the temperature of said chamber, the residence interval of the effluent in the chamber and the type of hydrogen fluoride acceptor, sometimes negatively influence the production of the desired tris(difluoramino)methyl compound. Furthermore, the use of such a chamber can cause fluorination of the attached radical, $R^1$, to give additional compounds of this invention.

The fluorination process can also be employed to introduce one, two or more fluorine atoms into the radical attached to the tris(difluoramino)methyl moiety if so desired to give additional useful compounds of this invention. In many cases several tris(difluoramino)methyl compounds differing in the amount of fluorine they contain are produced by a single fluorination of the —NFH containing adduct.

The scope of the above method of preparation is very broad. The radical, $R^1$, can contain many other substituents of the most varied nature consistent with the limitations set forth hereinabove. Thus $R^1$ can consist of a homogeneous or heterogeneous carbon chain, which can contain carbon atoms connected by, for example, oxygen, nitrogen, silicon, sulfur, boron and the like. Likewise $R^1$ can have functional substituents such as halogeno, cyano, nitro, carboxy, keto and like groups.

Method 2. The addition of anhydrous ammonia or its equivalent to a trifluoroformamidino compound, followed by replacement of hydrogen in the amino groups of the resulting adduct to form the tris(difluoramino)methyl compound.

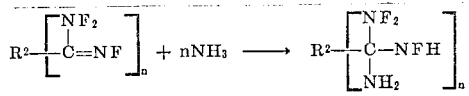

and

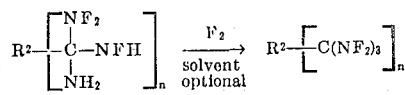

This method first involves the nucleophilic addition of ammonia or its equivalent to the fluorimino portion of a trifluoroformamidino compound. $R^2$ is an n-valent inorganic or organic radical such as chloro, cyano, polyfluoroalkyl, polyhaloalkyl and the like which is sufficiently electron withdrawing to facilitate the addition of ammonia to the fluorimino portion. The carbon chain of $R^2$ can be interrupted, as by oxo, aza or azo groups. Preferably, $R^2$ is free of substituent groups which react much more readily with ammonia than the fluorimino double bond of the trifluoroformamidino moiety; n is an integer equal to the valency of $R^2$. The addition of ammonia is usually carried out in the range of about $-125$ to $0°C$. and is often rapid even at the lower temperatures, particularly when $R^2$ is highly electronegative. When the addition reaction is very rapid, the use of inert solvent, low temperature, stirring and the gradual addition of ammonia diluted with an inert gas or liquid are advantageous. In many cases only a stoichiometric amount of ammonia is required. Suitable inert solvents include dimethylether, diethylether, acetonitrile, trichlorofluoromethane, perfluorooctane and the like.

In the second step of synthesis Method 2, the ammonia adduct is treated with fluorine, especially with elemental fluorine, to form the tris(difluoramino)methyl compound by replacement of hydrogen on the nitrogen atoms of the tris(amino)methyl group. The procedures used are those described in the preceding method. Generally, low concentrations of fluorine and temperatures in the range of $-50$ to $0°C$. are preferred. Because many of the intermediate adducts are quite reactive, solutions of these adducts are kept at low temperatures, i.e., below about $-20$ to $-40°C$. Fluorination is carried out soon after the synthesis of the adduct, either in the solvent used for the addition reaction or in another solvent, e.g., acetonitrile, which is more effective for the fluorination step. Fluorinations are carried out so that fragmentation is minimized, i.e., by careful control of the concentration of fluorine, temperature, rate of fluorination and the like.

Certain other compounds containing active hydrogen which have the general formula, $R^3R^4NH$, can be used in place of anhydrous ammonia provided that $R^3$ and $R^4$ are hydrogen or radicals which are replaced by fluorine during the fluorination step. For instance, $H-N=C=O$ as well as unsubstituted or substituted hydrazines may be used instead of $NH_3$ and are regarded as equivalent, for the purpose of synthesizing the compounds of this invention.

Method 3. The direct fluorination of an organic nitrogen compound which contains the diradical,

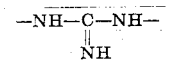

or its tautomeric form,

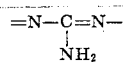

which is attached to hydrogen atoms or links radicals which can be similarly cleaved and replaced by fluorine.

This method is especially suited for the preparation of tris(difluoramino)fluoromethane. An example of the method is the fluorination of ammeline.

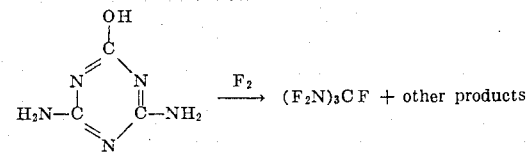

Additional examples of organic compounds which can be fluorinated directly to give tris(difluoramino)fluoromethane and other useful products are guanylurea, biquanide, cyanoguanidine, biuret, guanidine and the like. Various derivatives of these compounds such as their hydrofluoride salts can also be used.

Generally, fluorination of the above organic nitrogen compounds is carried out by employing procedures similar to those described previously in synthesis Method 1. The process is carried out in the range of $-50$ to $50°C$. using very dilute or pure fluorine. Concentrations of gaseous fluorine of less than about 15 percent are usually effective. The higher concentrations of fluorine can be employed, especially when the said organic nitrogen compound is mixed with liquid or solid diluents such as those described above which are preferably inert toward fluorine under ordinary conditions. Solid diluents can also be used to dissipate the heat of reaction and to act as an acceptor for the hydrogen fluoride produced, e.g., sodium fluoride, potassium fluoride and the like. Alternatively, hydrogen fluoride can be removed from the effluent gas stream by means of a chamber of an acceptor such as sodium fluoride maintained in the range of 25 to $100°C$. Fragmentation is minimized, i.e., by the regulation of the concentration of fluorine, temperature, rate of fluorination and the like.

Method 4. The radical to which the tris(difluoramino)methyl group is attached in the compounds prepared by the preceding methods is modified by chemical reactions, to produce a wide variety of tris(difluoramino)methyl compounds.

By reaction of functional substituents of these radicals, for example, hydroxyl, halogeno, cyano, alkoxy, carboxy, amido, amino and carbonyl and the like groups in known chemical synthetic methods, many new compounds are produced. Known methods are used, such as halogenation, oxidation, hydrolysis, polymerization and even mild reduction provided that these methods do not result in the destruction of the tris(difluoramino)methyl moiety.

Although anhydrous media preferred for these chemical modification processes, aqueous, neutral, acidic and even dilute basic media can be employed. Conditions which are to be avoided, especially for long contact times, include thermal reactions above 250°C.; strongly basic media such as 50 percent alcoholic potassium hydroxide and high concentrations of anhydrous or aqueous ammonia or hydrazine; strongly reducing media such as aqueous potassium iodide solutions, sodium dispersions and the like.

The broad scope of this method of synthesis is illustrated as follows by some reactions of methyl tris(difluoramino)methoxyacetate,

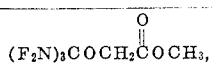

and its derivatives.

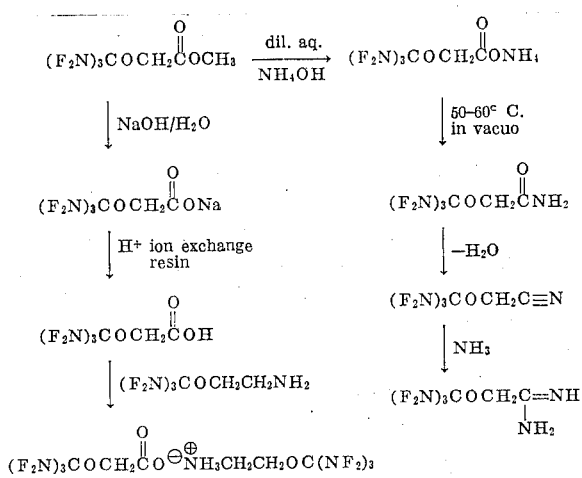

In general, the tris(difluoramino)methyl moiety of the compounds of this invention can be regarded as an electronegative group with respect to the attached radical. It can therefore influence the reactivity of the attached radical. For example, when the attached radical is cyano, the carbon to nitrogen unsaturated linkage of the cyano functional group is usually highly reactive, especially toward nucleophilic reactants such as ammonia, amines, sodium azide, hydroxylamine and the like, thus providing additional useful compounds of the invention.

The tris(difluoramino)methyl substituted compounds of the invention can be gases, liquids or solids under ordinary conditions. They range from highly volatile substances boiling as low as about 0°C. to liquids or solids having little volatility. All of the compounds are oxidants; their oxidizing properties are indicated by the fact that they react with potassium iodide solutions, such as a solution of potassium iodide in aqueous acetonitrile, to liberate iodine.

The compounds of this invention can be isolated and purified by several techniques. In the case of gases or liquids boiling up to about 200°C., they can be purified by distillation; utmost caution is employed, especially with large amounts and when the highly oxidizing tris(difluoramino)methyl moiety represents a large proportion of the molecule. They can also be purified by gas-liquid chromatography, in which high boiling nonreactive liquids, solids or polymers on an inert solid support (e.g., diatomaceous earth or firebrick) are used as the stationary phase. In the case of solids, the tris(difluoramino)methyl compounds can be purified by recrystallization, solvent extraction, sublimation, solid-liquid absorption column chromatography and other related techniques.

Care must be used in the selection of solvents for the procedures described above so as to avoid reaction with, or decomposition of, the very reactive tris(difluoramino)methyl moiety. In general, anhydrous conditions are preferably maintained in handling these compounds, although this is not always necessary. Suitable solvents include trichlorofluoromethane, benzene, hexene, chloroform, ethylacetate, trifluoroethanol, diethylether, tetrahydrofuran, carbon tetrachloride, acetic acid, methanol and the like. Solvents which must be used with extreme care and usually avoided include stronly basic or reducing media such as liquid ammonia, hydrazine, alcoholic alkali, aqueous iodide solutions and the like.

The tris(difluoramino)methyl group of the compounds of this invention can be characterized by infrared absorptions in the region of about 9.5 to 11.5 microns. These are usually complex and broad and are associated with the difluoramino groups. The intensities of these absorptions can vary widely depending on the characteristics of the attached radical. Absorptions characteristic of the attached radical, particularly its functional groups such as various carbon-carbon unsaturations, carbon-nitrogen unsaturations, carbon-oxygen unsaturations and the like having absorptions particularly between about 2 to 8.5 microns, are readily distinguished and do not interfere with the absorptions due to the tris(difluoramino)methyl group.

Fluorine and proton nuclear magnetic resonance spectroscopic measurements also serve to identify the described compounds. Various types of fluorine-containing groups in the molecule can be distinguished by their shielding values expressed in $\phi$ units, employing $CFCl_3$ as the reference compound as described by G. Filipovich and G. V. D. Tiers (J. Phys. Chem., Vol. 63, pp. 761–762, 1959); the $\phi^*$ values defined therein are herein termed $\phi$ values. Likewise, various types of hydrogen-containing groups of the radical attached to the tris(difluoramino)methyl moiety can be distinguished by their shielding values expressed simply as $\tau$ when tetramethylsilane is employed as reference as described by G. V. D. Tiers (J. Phys. Chem., Vol. 62, p. 1151, 1958).

The tris(difluoramino)methyl functional group of the compounds of this invention usually exhibits a single, sometimes broad, peak at a shielding value in the region of about $-10$ to $-60$ $\phi$ and more usually in the region of $-20$ to $-35$ $\phi$ which is due to its six fluorine atoms, each attached to nitrogen. Compounds having more than one tris(difluoramino) functional group in the molecule can exhibit more than one absorption peak.

The compounds of this invention are oxidants useful as bleaching agents, explosive ingredients, rocket fuel ingredients, pyrotechnic ingredients and chemical intermediates. In general, the compounds containing the tris(difluoramino)methyl functional group in a high proportion relative to the molecular weight of the remainder of the compound are especially useful for rocket propellants or explosives, whereas those compounds containing the tris(difluoramino)methyl group in a low proportion relative to the remainder of the compound are especially useful as bleaching agents. Oxidizing groups which contain oxygen can be present in the molecule with the tris(difluoramino)methyl group and such compounds can be exceptionally high-energy monopropellants, such as $(F_2N)_3COCH_2CH_2NH_3{}^+Cl^-O_4$. Such ionic solids are of special utility in the formulation of very high energy solid rocket propellants.

Many of the compounds of the invention require safety equipment and special techniques for handling since they are toxic and can be exploded when subjected to impact, rapid cooling or heating. Generally speaking, ordinary laboratory hoods equipped with ¼ to ½ inch plastic shields provide a safe working area when about 1 gram of any of the most energetic compounds such as tris(difluoramino)fluoromethane is manipulated, reacted, tested, stored, etc. Protective clothing for the operator, such as leather jacket, gloves, face shield and ear plugs, is recommended. Large quantities of these chemicals should be handled with remote manipulators.

When in pure or highly concentrated form, certain compounds of the invention and their precursors have a higher tendency to explode when undergoing phase changes. Therefore, the use of a non-flammable slush bath such as a $-111°C$. bath prepared by mixing liquid nitrogen with trichlorofluoromethane is recommended when said compound is volatile and is manipulated in gas transfer systems, since at such temperatures the volatile compounds of the invention are condensed to liquids but are not frozen.

Polymeric compounds containing the tris(difluoramino)methyl moiety can be prepared by methods described hereinabove. For example, previously known polymers containing appropriate active-hydrogen-containing nucleophilic groups can be reacted with perfluoroguanidine as indicated hereinabove to form and adduct with one or more of said groups. The adduct is fluorinated to produce polymers having tris(difluoramino)methyl substituents.

Illustrative of polymers which can be employed thus are polyvinyl alcohol, polyethylene oxides with hydroxyl end groups, cellulose mononitrate, cellulosic materials such as starch and cotton, hydrolyzed copolymers of vinyl acetate and polyvinyl amine and the like. It will be appreciated that where the polymer contains several similar or dissimilar active-hydrogen-containing groups distributed along the chain, one or more of such active hydrogens can be replaced by the tris(difluoramino)methyl functional group, thus producing poly[tris(difluoramino)methyl]-substituted polymers.

Polymers encompassed by this invention can also be synthesized by known free radical or ionic polymerization techniques, starting with monomeric tris(difluoramino)methyl compounds having polymerizable substituents. Such polymerizable substituents for addition polymerization include acrylate, vinyl epoxy, vinylether and the like groups. Similarly, compounds of the invention containing two or more carboxyl groups can be condensed with compounds containing two or more aliphatic hydroxyl groups, to form polyesters; with polyamines to form polyamides, etc. In the polymers of this invention the tris(difluoramino)methyl group retains its chemical characteristics.

When the compounds of this invention are non-polymeric, preferably from about one to 30 carbon atoms are present therein. In contrast, polymeric substances of this invention may have molecular weights extending to 50,000 or more and may contain hundreds and even thousands of carbon atoms in the polymer chain.

The difluoramino portion of the tris(difluoramino)-methy group can be substituted by replacement of one of the fluorine atoms by a low molecular weight, fluorinated alkyl group, fluoramino fluoroalkyl group and the like. The resulting substituted group is equivalent to the tris(difluoramino)methyl group for the purposes of inclusion in the compounds of this invention. An example of such a substituted fluoramine is $CF_3NFCF(NF_2)_2$. Such compounds are preferably prepared by synthesis Method 3, described hereinabove; and they are likewise oxidants, useful as bleaches, propellant ingredients and the like.

The following examples, in which all parts are by weight and percentages are weight/volume unless otherwise specified, will more specifically illustrate the compounds of the invention and the processes for their production. Certain commercially available fluorochemical compositions are identified by trademark names therein as follows: Kel-F 90 grease and Kel-F oil 8126 are low molecular weight poly(chlorotrifluoroethylene); FX-45 is a fluorocarbon liquid boiling in the range of about 80–120°C. at one mm.; FC-43 is predominantly perfluorotributyl amine and FC-75 is a fluorochemical liquid boiling at about 100°C. SE-30 is a silicone gum rubber; LSX-3-0295 is a fluorosilicone gum rubber and FS-1265 is a polyfluorosiloxane.

EXAMPLE 1

Ammeline (1.5 g.) is spread onto a 2 inch by 12 inch copper tray which is placed in a 1.5 liter horizontal cylindrical copper reactor (Reactor A). The reactor is fitted with a gas inlet for fluorine and/or nitrogen at one end and an effluent gas outlet at the other end. The gas outlet is connected serially to an iron tube filled with sodium fluoride pellets which is maintained at room temperature (temperatures up to 100°C. can be used and are often more efficient for removing hydrogen fluoride from the effluent), followed by a borosilicate glass trap which is cooled with liquid air and then finally a vent line.

The reactor is first flushed with nitrogen to expel air and is then cooled by means of a bath maintained at $-15°C$. The nitrogen flow is continued until the temperature inside of the reactor near the copper tray is about $-3°C$. Gaseous fluorine, diluted with nitrogen, is then introduced into the reactor at a volume concentration of 6 percent until a total of about 0.15 mole of fluorine is delivered over a period of 7 hours. After the completion of the addition of fluorine, the reactor is allowed to warm to room temperature and is flushed with nitrogen during this period. The volatile fluorination products are collected in the trap cooled with liquid air, while solid and liquid products having low volatility remain in the reactor.

The trap is closed, evacuated to remove nitrogen and the contents are then allowed to warm to room temperature and are transferred under vacuum into a 15 ml. tube which is cooled to about −140°C. and is attached to a vacuum manifold. The tube and contents are then allowed to warm gradually to about −78°C. and then maintained at this temperature by means of a trichloroethylene-dry ice slush bath. The more volatile components (7.8 millimoles) which expand into a volume of 0.12 liter are composed of products such as carbonyl fluoride, nitrogen trifluoride and tetrafluoromethane and are bled off intermittently until a final vapor pressure of about 40 mm. Hg (in a volume of 0.12 liter) remains above the liquid in the tube. The residue, which amounts to a total of about 1.1 grams, is then allowed to warm gradually to 25°C. and the volatile fraction (Fraction I) is expanded into a 0.12 liter manifold and is condensed into a storage vessel until a vapor pressure of about 60 mm. Hg remains above a small amount of a high boiling liquid residue in the tube. Fraction I amounts to about 0.7 ml. of liquid when measured at −78°C. and contains tris(difluoramino)fluoromethane, $(F_2N)_3CF$, as well as $CF_2(NF_2)_2$, $(F_2N)_2C=NF$, $CF_3NFCF(NF_2)_2$ and various NF-containing compounds boiling in the range of about −30 to +30°C.

About 30 percent (area percent by chromatography) of Fraction I is found to be tris(difluoramino) fluoromethane and can be separated by gas-liquid chromatography employing, for example, a 24 foot, ⅜ inch column composed of 33 percent by weight of the fluorochemical, FX-45, on acid washed Chromasorb P (a commercially available diatomaceous silica product), mesh 30/60. The procedure is carried out at room temperature with helium as the carrier gas. The retention value, designated as $T_R$, for tris(difluoramino)fluoromethane under the above conditions is 134 relative to trichlorofluoromethane as a standard of 100.

Retention values, $T_R$, are obtained by the equation $$T_R = \frac{(\text{retention time of component}) - (\text{retention time of air})}{(\text{retention time of standard}) - (\text{retention time of air})} \times 100$$

Tris(difluoramino)fluoromethane and other NF compounds can be isolated by chromatography employing various other column packings such as 33 percent by weight of the fluorochemical, FC-43, on Chromasorb P at a column temperature of about −10°C.

If desired, Fraction I can be treated with aqueous alkali to give a mixture having fewer components and which is enriched with tris(difluoramino)fluoromethane, thus providing a mixture which can be more readily separated by chromatography or distillation. As an example of this treatment, 1.2 grams of Fraction I is mixed with nitrogen and allowed to pass through a borosilicate glass bubbler containing 50 ml. of 0.13 N aqueous sodium hydroxide. The bubbler is equipped with a dispersion disc at the bottom and a drying tube filled with anhydrous $CaSO_4$ at the outlet followed by a liquid air cooled trap open to the atmosphere. The product (about 0.7 g.) in the trap is found to contain mainly $CF_2(NF_2)_2$ and $CF(NF_2)_3$ in the ratio of 3:2 as well as a small amount of 1,1-bis(difluoramino)-2-fluoro-perfluoro-2-azapropane, having the structure $CF_3NFCF(NF_2)_2$. The compound $CF_3NFCF(NF_2)_2$ boils at about 30° C. and has fluorine n.m.r. $\phi$ values at −23.1 ($NF_2$), 67.3 ($CF_3$), 89.9 ($NF$) and 132.4 ($CF$) in the ratio of about 4:3:1:1, respectively.

Analysis:
Calculated for $C_2F_9N_3$: C, 10.1; N, 17.7; F, 72.2.
Found: C, 10.6; N, 18.1; F, 69.7.

Tris(difluoramino)fluoromethane is a colorless gas which has a melting point of −137 to −132°C., and a boiling point of 5.6 ± 1°C. Its infrared spectrum consists of a strong absorption band at 7.82 microns in the region for C-F stretching and a complex, strong and broad adsorption between 10 microns and 11.5 microns attributed to the NF stretching. The fluorine nuclear magnetic resonance (n.m.r.) spectrum for tris(difluoramino)fluoromethane exhibits a peak at −23.3 assigned to the fluorine atoms of the $NF_2$ groups and a sharp peak at 138.7 $\phi$ due to the fluorine atom of the CF. The NF to CF area ratio is approximately six to one.

Analysis:
Calculated for $CN_3F_7$: C, 6.42; N, 22.47; F, 71.11; molecular weight, 187.
Found: C, 6.5; N, 22.1; F, 71.8; molecular weight, 183.

$(F_2N)_3CF$ can also be identified by its characteristic mass spectrum. Tris(difluoramino)fluoromethane, whether in pure state or in mixtures, must be handled and stored with great care, even in very small amounts, and preferably behind a barricade.

Example 2

Methyl tris(difluoramino)methoxyacetate,

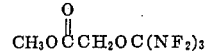

is prepared by the fluorination of

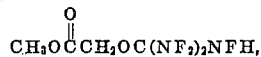

the adduct of perfluoroguanidine and methyl glycolate. Into a dry 10 ml. borosilicate glass reactor (conveniently fitted with a polytetrafluoroethylene needle valve) are placed 0.52 ml (7.4 millimoles) of methyl glycolate, 3 ml. of dry acetonitrile and 0.02 g. of urea. The reactor is cooled to −110°C., and further charged under vacuum with 1.2 g. (7.9 millimoles) of perfluoroguanidine. The valve is closed and the reaction mixture is allowed to warm gradually to room temperature. After standing overnight, the mixture appears as a clear, nearly homogeneous solution. The adduct may be obtained in high purity by removal of solvent and any perfluoroguanidine under reduced pressure.

The adduct is then dissolved in 7 ml. of dry acetonitrile and fluorinated in a 50 ml. reactor made of polytrichlorofluoroethylene. A mixture of 5 volume percent of fluorine in nitrogen is passed through the solution at 0°C. until a total of 70 millimoles of fluorine has been delivered over a period of 7 hours. The solution and the reactor are purged with nitrogen and the volatile components are removed under vacuum. Fluorine n.m.r.

and infrared analyses of the liquid residue having a vapor pressure of less than 2 mm. Hg at 25°C. indicate a good conversion to methyl tris(difluoramino)methoxyacetate. The ester is purified by the use of column chromatography employing silica gel as the absorbent and chloroform as the eluent, or by gas-liquid chromatography employing a column composed of 20 percent by weight of SE-30 on Celite (diatomaceous earth), at 80°C. Its retention value ($T_R$) relative to tetrachloroethylene as the standard of 100 is about 218 on a 3 meter, ¼ inch SE-30 column.

Methyl tris(difluoramino)methoxyacetate is a high boiling, colorless liquid having a vapor pressure of less than about 2 mm. Hg at 25°C. Its fluorine n.m.r. spectrum exhibits a peak at −23.1 $\phi$ and its proton n.m.r. spectrum exhibits a peak at about 5.14τdue to $CH_2$ and another peak at 6.22τdue to $CH_3$. The infrared spectrum of the compound contains a characteristic carbonyl absorption at 5.6 microns, as well as a broad complex absorption in the 10.0 to 11.5 micron region.

Analysis:
Calculated for $C_4H_5F_6N_3O_3$: C, 18.7; F, 44.3.
Found: C, 18.6; F, 44.0.

Example 3

A solution of 0.7 mmole. of the adduct of perfluoroguanidine and methyl glycolate,

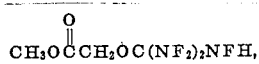

in trifluoroethanol is prepared. Fluorine in concentration of 3.5 volume percent in nitrogen is passed through the solution continuously in an enclosed borosilicate glass reactor under a pressure of about one atmosphere. The fluorine (1.5 mmoles. total) is recirculated through the adduct solution over a period of 19 hours while the solution is allowed to warm gradually from −23° to +20°C. The progress of the reaction can be followed by fluorine n.m.r. analysis. The reaction mixture is purified by chromatography as described in Example 2. A high yield of methyl tris(difluoramino)-methoxyacetate is obtained.

Example 4

Methoxybis(difluoramino)fluoroaminomethane ($CH_3OC(NF_2)_2NFH$) is prepared by the reaction of 2.7 millimoles of methanol with 3.0 millimoles of perfluoroguanidine in a 10 ml. sealed borosilicate glass reactor. The reaction mixture is kept at room temperature for 15 hours. Volatile products which are formed are removed by exposing the contents of the reactor to reduced pressure by connecting it to a vacuum manifold, until a residue having a vapor pressure of about 15 mm. Hg at 25°C. remains. The residue is nearly pure $CH_3OC(NF_2)_2NFH$.

About 0.8 g. (4.4 millimoles) of methoxybis(difluoramino)fluoroaminomethane is placed in a copper dish in a 0.4 liter copper reactor. The reactor is purged with nitrogen and cooled to −35°C. Fluorine in concentration of 2.7 volume percent in nitrogen is allowed to pass over the sample for 3 hours until about 80 millimoles of fluorine is delivered. During fluorination, the effluent gas stream is allowed to pass through about 10 inches of copper tubing and then into a trap cooled with liquid air. The system is then purged with nitrogen while warming to room temperature.

The trap contains methoxytris(difluoramino)methane, $CH_3OC(NF_2)_3$, which can be purified by gas-liquid chromatography employing a 3 meter, ½ inch column of 20 percent by weight of LSX-3-.295 (a silicon rubber from Dow Corning) on acid washed Celite at 25°C. ($T_R$ = 637 relative to $CFCl_3$ as 100). This tris(difluoramino)methyl compound is a liquid having a vapor pressure of about 70 mm. Hg at 25°C.; its fluorine n.m.r. spectrum exhibits a peak at −22.2 $\phi$ and its proton n.m.r. spectrum exhibits a peak at about 5.87τ.

Example 5

The fluorination process described in Example 4 is repeated with 0.55 millimole of $CH_3OC(NF_2)_2NFH$ using 4.3 volume percent of fluorine at −20°C. over a period of 2 hours until a total of about 60 millimoles of fluorine is delivered. The effluent gas, however, is allowed to pass through an iron tube filled with sodium fluoride pellets which is maintained at 25°C. and precedes the borosilicate collection trap. The product collected in the trap amounts to about 0.35 millimole and contains $CH_3OC(NF_2)_3$, $CH_2FOC(NF_2)_3$ and $CHF_2OC(NF_2)_3$ in the ratio of about 3:9:8, respectively. These products are separated from the mixture by chromatography using the above-mentioned silicon gum rubber column.

Fluoromethoxy tris(difluoramino)methane, $CH_2FOC(NF_2)_3$, is a liquid which exhibits a fluorine n.m.r. peak at −23.5 $\phi$ due to the $NF_2$ groups and another at 149.3 $\phi$ (triplet) due to the fluorine attached to carbon in the ratio of about 6:1, respectively. A proton n.m.r. peak is found at 4.16τ.

Difluoromethoxy tris(difluoramino)methane, $CHF_2OC(NF_2)_3$, similarly is a liquid exhibiting fluorine n.m.r. peaks at −24.5 $\phi$ due to the $NF_2$ groups and at 80.6 $\phi$ (doublet) due to the fluorine atoms attached to carbon. A proton n.m.r. peak is found at 3.04 τ.

Example 6

A solution containing 3 millimoles of $HFNC(NF_2)_2OCH_2CH_2OC(NF_2)_2NFH$ (prepared by the reaction of ethylene glycol and perfluoroguanidine) in trifluoroethanol is fluorinated using procedures similar to those described in Example 3. Fluorine in concentration of aboutt 5 volume percent in nitrogen is passed through the solution for 5 hours at a temperature in the range of −23° to +25°C. A total of about 3.5 millimoles of fluorine is used. The reaction mixture is subjected to chromatography at 100°C. using a column composed of silicon gum rubber on diatomaceous earth. There is obtained 1,2-bis[tris(difluoramino)methoxy] ethane, $(F_2N)_3COCH_2CH_2OC(NF_2)_3$, which is a high boiling liquid having a vapor pressure of less than 1 mm. Hg at room temperature. The retention value, $T_R$, is about 342 relative to tetrachloroethylene. This tris(difluoramino)methyl compound exhibits n.m.r. peaks at about − 21.1 $\phi$ due to the fluorine atoms of the $NF_2$ groups and at 5.3τdue to the proton atoms of the $CH_2$ groups.

Example 7

The adduct, $(CH_3)_2C=NOC(NF_2)_2NFH$ is prepared by the reaction of acetoxime and perfluoroguanidine. Using procedures similar to those described in Example 4, about 3.6 millimoles of this adduct are fluorinated at −35°C. Fluorine in concentration of 3 volume percent in nitrogen is passed through the reactor for 5 hours until a total of about 54 millimoles of fluorine is introduced into the reactor. The reaction mixture is separated by chromatographic procedures. There is obtained O-tris(difluoramino)methylacetoxime, $(CH_3)_2C=NOC(NF_2)_3$, a high boiling liquid. It has a fluorine n.m.r. peak at about $-24.4\ \phi$ due to all six of the fluorines attached to nitrogen. Also obtained are several other tris(difluoramino)methyl compounds produced by fluorination of the methyl groups of the acetoxime residue. These include the compound $(CH_3)(CH_2F)C=NOC(NF_2)_3$.

Additional examples of the synthesis of tris(difluoramino)methyl compounds by fluorination of monofluoramino (NFH) compounds are found in Table I. The starting materials are prepared by the nucleophilic reaction of perfluoroguanidine and compounds containing active hydrogen. Thus, the adduct of diethylketimine and perfluoroguanidine yields $(C_2H_5)_2C=N-C(NF_2)_3$ upon fluorination.

TABLE I

| Example | Monofluoramino compound | Tris(difluoramino)methyl compound |
|---|---|---|
| 8 | $HOCH_2CH_2OC(NF_2)_2NFH$ | $HOCH_2CH_2OC(NF_2)_3$ |
| 9 | $CH_2\!\!-\!\!CHCH_2OC(NF_2)_2NFH$ (epoxide) | $CH_2\!\!-\!\!CHCH_2OC(NF_2)_3$ (epoxide) |
| 10 | $\overline{CH_2CH_2CH_2O}CHCH_2OC(NF_2)_2NFH$ | $\overline{CH_2CH_2CH_2O}CHCH_2OC(NF_2)_3$ |
| 11 | succinimide-$NCH_2OC(NF_2)_2NFH$ | succinimide-$NCH_2OC(NF_2)_3$ |
| 12 | $CH_3(CH_2)_3OC(NF_2)_2NFH$ | $CH_3(CH_2)_3OC(NF_2)_3$ |
| 13 | $CH_3(CH_2)_{11}OC(NF_2)_2NFH$ | $CH_3(CH_2)_{11}OC(NF_2)_3$ |
| 14 | $C_6H_5CH_2OC(NF_2)_2NFH$ | $C_6H_5CH_2OC(NF_2)_3$ |
| 15 | $ClO_4^-\ ^+H_3NCH_2CH_2OC(NF_2)_2NFH$ | $ClO_4^-\ ^+H_3NCH_2CH_2OC(NF_2)_3$ |
| 16 | $CH_3OC(O)C_6H_4OC(NF_2)_2NFH$ | $CH_3OC(O)C_6H_4OC(NF_2)_3$ and $FCH_2OC(O)C_6H_4OC(NF_2)_3$ |
| 17 | $\overline{CH_2(CH_2)_3CH_2}CHOC(NF_2)_2NFH$ | $\overline{CH_2(CH_2)_3CH_2}CHOC(NF_2)_3$ |
| 18 | $CH_3\overset{O}{\overset{\|}{C}}OCH_2CH_2OC(NF_2)_2NFH$ | $CH_3\overset{O}{\overset{\|}{C}}OCH_2CH_2OC(NF_2)_3$ |
| 19 | $CF_3\overset{O}{\overset{\|}{C}}OCH_2CH_2OC(NF_2)_2NFH$ | $CF_3\overset{O}{\overset{\|}{C}}OCH_2CH_2OC(NF_2)_3$ |
| 20 | $CH_2=CHCH_2OC(NF_2)_2NFH$ | $CH_2=CHCH_2OC(NF_2)_3$ |
| 21 | $CHCH_2OC(NF_2)_2NFH \| CHCH_2OC(NF_2)_2NFH$ | $CHCH_2OC(NF_2)_3 \| CHCH_2OC(NF_2)_3$ |
| 22 | $HC\equiv CCH_2OC(NF_2)_2NFH$ | $HC\equiv CCH_2OC(NF_2)_3$ |
| 23 | $F_2NCH_2CH(NF_2)CH_2OC(NF_2)_2NFH$ | $F_2NCH_2CH(NF_2)CH_2OC(NF_2)_3$ |
| 24 | $CF_3CH_2OC(NF_2)_2NFH$ | $CF_3CH_2OC(NF_2)_3$ |
| 25 | $H_2C-OC(NF_2)_2NFH$ $HC-OC(NF_2)_2NFH$ $H_2C-OC(NF_2)_2NFH$ | $H_2C-OC(NF_2)_3$ $HC-OC(NF_2)_3$ $H_2C-OC(NF_2)_3$ |
| 26 | $OCH_2CH(OH)CH_2OC(NF_2)_2NFH$ $\|$ $C(NF_2)_2NFH$ | $OCH_2CH(OH)CH_2OC(NF_2)_3$ $\|$ $C(NF_2)_3$ |
| 27 | $O_2N\text{-}C_6H_4\text{-}OC(NF_2)_2NFH$ | $O_2N\text{-}C_6H_4\text{-}OC(NF_2)_3$ |
| 28 | $O_2NC(CH_2OC(NF_2)_2NFH)_3$ | $O_2NC(CH_2OC(NF_2)_3)_3$ |
| 29 | $C(CH_2OC(NF_2)_2NFH)_4$ | $C(CH_2OC(NF_2)_3)_4$ |
| 30 | $-\!\!\left(\!(CH_2CH)_m\atop OH\!\right)\!\left(\!CH_2CH\atop \underset{C(NF_2)_2NFH}{O}\!\right)_n\!-^a$ | $-\!\!\left(\!CH_2CH\atop OH\!\right)_m\!\left(\!CH_2CH\atop \underset{C(NF_2)_3}{O}\!\right)_n\!-^a$ |
| 31 | $CH_3O\overset{O}{\overset{\|}{C}}CH=NOC(NF_2)_2NFH$ | $CH_3O\overset{O}{\overset{\|}{C}}CH=NOC(NF_2)_3$ |

$^a$ Polyvinyl alcohol modified polymer with random distribution of fluoraminomethyl groups where m and n are integers.

TABLE I—Continued

| | Monofluoramino compound | Tris(difluoramino)methyl compound |
|---|---|---|
| 32 | H₂N—C(=NOC(NF₂)₂NFH)—C(=NOC(NF₂)₂NFH)—NH₂ | H₂N—C(=NOC(NF₂)₃)—C(=NOC(NF₂)₃)—NH₂ and H₂N—C(=NOC(NF₂)₃)—C(=NOC(NF₂)₂NFH)—NH₂ |
| 33 | HC(=NOC(NF₂)₂NFH)—HC(=NOC(NF₂)₂NFH) | HC(=NOC(NF₂)₃)—HC(=NOC(NF₂)₃) |
| 34 | H₂NCH=NOC(NF₂)₂NFH | H₂NCH=NOC(NF₂)₃ |
| 35 | C₆H₅SO₂NHOC(NF₂)₂NFH | C₆H₅SO₂NHOC(NF₂)₃ |
| 36 | CH₃C(O)OC(NF₂)₂NFH | CH₃C(O)OC(NF₂)₃ |
| 37 | C₆H₅C(O)OC(NF₂)₂NFH | C₆H₅C(O)OC(NF₂)₃ |
| 38 | CH₂=CHC(O)OC(NF₂)₂NFH | CH₂=CHC(O)OC(NF₂)₃ |
| 39 | CF₃—C₆H₄—NHC(NF₂)₂NFH | CF₃—C₆H₄—NHC(NF₂)₃ |
| 40 | N≡C—C₆H₄—NHC(NF₂)₂NFH | N≡C—C₆H₄—NHC(NF₂)₃ |
| 41 | H₂NC(O)NHC(NF₂)₂NFH | H₂NC(O)NHC(NF₂)₃ |
| 42 | (CH₃)₂C=NNHC(NF₂)₂NFH | (CH₃)₂C=NNHC(NF₂)₃ |
| 43 | CF₃C(O)NHNHC(NF₂)₂NFH | CF₃C(O)NHNHC(NF₂)₃ |
| 44 | succinimido-C(NF₂)₂NFH | succinimido-C(NF₂)₃ |
| 45 | (triazolyl)CNHC(NF₂)₂NFH | (triazolyl)CNHC(NF₂)₃ |
| 46 | C₂H₅OOC(NF₂)₂NFH | C₂H₅OOC(NF₂)₃ |
| 47 | (NF₂)₂CO—C₆H₄—C(C₂H₅)=C(C₂H₅)—C₆H₄—OC(NF₂)₂NFH (NFH) | (NF₂)₃CO—C₆H₄—C(C₂H₅)=C(C₂H₅)—C₆H₄—OC(NF₂)₃ |
| 48 | Cholesterol—OC(NF₂)₂NFH | Cholesterol—OC(NF₂)₃ |
| 49 | Testosterone—OC(NF₂)₂NFH | Testosterone—OC(NF₂)₃ |
| 50 | (CH₃)₃COOC(NF₂)₂NFH | (CH₃)₃COOC(NF₂)₃ |
| 51 | maleimido-OC(NF₂)₂NFH | maleimido-OC(NF₂)₃ |
| 51a | C₆H₅N(CH₃)—C(NF₂)₂NFH | C₆H₅N(CH₃)—C(NF₂)₃ |
| 51b | C₂H₅OC(O)NHOC(NF₂)₂NFH | C₂H₅OC(O)NHOC(NF₂)₃ |

ᵃ Polyvinyl alcohol modified polymer with random distribution of fluoramino methyl groups where m and n are integers.

Example 52

The compound of the formula,

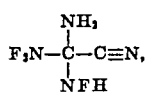

is prepared as follows. A gaseous mixture of 2 millimoles of ammonia and dimethylether (8 millimoles) is gradually added under reduced pressure to a stirred solution of 2 millimoles of perfluorocyanoformamidine, F₂N—C(=NF) C ≡ N, in about 1.5 ml. of liquid dimethylether at −110°C. A 5 ml. borosilicate glass reactor can be used. The resulting mixture is stirred at −110°C.

for 1 hour. The dimethyl ether and volatile components are removed at −63°C. under vacuum untill the vapor pressure above the residue in the reactor is less than about 2 mm. Hg. To the residue, which contains the desired product mixed with a small amount of dimethylether, is added 2.5 cc. of dry acetonitrile under vacuum. The mixture is then allowed to warm to about −35°C. until a light yellow solution is formed. The product can be fluorinated without further purification or isolation. Conveniently, the mixture is stored at −78°C. under a dry nitrogen atmosphere.

Fluorination of the acetonitrile solution of the adduct thus prepared is carried out in a borosilicate glass reactor at about −35°C. Fluorine in concentration of 3 volume percent in nitrogen is passed through the solution at a metered constant rate from a 3.0 liter cylinder. After 6 hours, a total of 28.5 millimoles of fluorine is used. A tube filled with NaF pellets and maintained at 25°C. can be used to remove hydrogen fluoride from the effluent gas. The volatile product (6.3 millimoles) is collected in two glass traps in series which are cooled with liquid oxygen. The progress of the fluorination can be followed by chromatographic analysis of the effluent gas stream. This analytical technique is conveniently used to determine when the fluorination is completed.

The product, which contains dimethyl ether, acetonitrile and tris(difluoramino)acetonitrile, is allowed to warm gradually to room temperature and is passed under vacuum through a trap cooled to −78°C. followed by a trap cooled with liquid nitrogen. Chromatographic separation of the components of the liquid nitrogen cooled trap (4.4 millimoles), carried out on a 24 ft., ½ inch column composed of 33 percent by weight of the fluorochemical FX-45 on Chromasorb P at 25°C., yields 1.1 millimoles of a mixture of $(F_2N)_3C-C\equiv N$ ($T_R$ = 287 with $CFCl_3$ as standard) and a small amount of dimethyl ether. Additional purification is accomplished by using an 18 foot, ½ inch column composed of 33 percent by weight of the fluorochemical Kel-F oil 8126 on Chromasorb P at 25°C. A high purity sample of 0.8 millimole of $(F_2N)_3C-CN$ ($T_R$ = 118 with $CFCl_3$ as standard) is obtained.

Tris(difluoramino)acetonitrile is a colorless liquid, has a vapor pressure of about 505 millimeters Hg at 23°C. and boils at about 32°C. Its infrared spectrum exhibits an absorption at 4.42 microns due to the $-C\equiv N$ group and strong absorptions at about 10.3 microns, 10.6 microns and 11.0 microns which are assigned to the $NF_2$ groups. Its fluorine n.m.r. spectrum exhibits a peak at −38.8 $\phi$.

Analysis:
  Calculated for $C_2F_6N_4$: C, 12.4; F, 58.8; N, 28.9, molecular weight, 194.
  Found: C, 12.6; F, 58.0; N, 29.4, molecular weight, 193.

Example 53

Procedures similar to those described in Example 52 can be used to prepare tetrakis(difluoramino)methane, $C(NF_2)_4$ and other tris(difluoramino)methyl compounds. The adduct, $(F_2N)_2C(NFH)NH_2$, is prepared by the addition of ammonia to perfluoroguanidine using dimethyl ether as solvent. The reaction proceeds rapidly even at −110°C. The dimethyl ether is removed under vacuum until about less than one mm. Hg remains above the residual adduct at −63°C. The adduct (0.02 mole) which is combined with some dimethyl ether is then dissolved in 40 ml. of trifluoroethanol, keeping the temperatures below about −25°C. Fluorine in 20 volume percent concentration in nitrogen is passed through the stirred solution of the adduct at about −40°C. for about 5 hours, until 0.30 mole of fluorine has been delivered. The product which collects in traps cooled with liquid air is separated into its various components by gas-liquid chromatography using, for example, an 18 foot, ½ inch column composed of 33 percent by weight of Kel-F oil 8126 on acid-washed Chromasorb P, and operated at room temperature. Tris(difluoramino)fluoromethane and tetrakis(difluoramino)methane are isolated. The retention value ($T_R$) for $C(NF_2)_4$ is 160, using $CFCl_3$ as a reference of 100. Other columns such as a column composed of 20 percent by weight of the fluorine-containing silastic FS-1265 (Dow Corning) on Chromasorb P can be used. Tetrakis(difluoramino)methane is a colorless liquid which boils at about 41°C. (391 mm. Hg vapor pressure at 24°C.) and melts at −13.5 to −12.5°C. Its fluorine n.m.r. spectrum exhibits a peak at −29.3 $\phi$ due to the six fluorine atoms. The infrared spectrum of $C(NF_2)_4$ contains very strong absorptions at 10.19, 10.51 and 10.96 microns due to N–F groups and weak absorptions at 8.94, 9.47 and 14.76 microns. The compound is soluble in $CFCl_3$, $CF_2Cl_2$, $CF_3CH_2OH$, $CH_3CN$ and $N_2F_4$.

Analysis.
  Calculated for $CF_8N_4$: C, 5.4; F, 68.2; molecular weight, 220.
  Found: C, 5.4; F, 68.2; molecular weight, 218.

Additional examples for the formation of the compounds of this invention by the fluorination of adducts of ammonia and various trifluoroformamidino compounds are shown in Table II. Thus, for example, the adduct of ammonia and azotrifluoroformamidine $(NF_2C(=NF)-N=N-C(=NF)NF_2)$ yields $(NF_2)_3C-N=N-C(NF_2)_3$ upon fluorination.

TABLE II

| Example: | Trifluoroformamidino compound | Ammonia adduct | Tris(difluoramino)-methyl compound |
|---|---|---|---|
| 54 | $CF_3NFC(=NF)NF_2$ | $CF_3NFC\begin{smallmatrix}NFH\\-NF_2\\NH_2\end{smallmatrix}$ | $CF_3NFC(NF_2)_3$ |
| 55 | $ClC(=NF)NF_2$ | $ClC\begin{smallmatrix}NFH\\-NF_2\\NH_2\end{smallmatrix}$ | $ClC(NF_2)_3$ |
| 56 | $CH_3C(=NF)NF_2$ | $CH_3C\begin{smallmatrix}NFH\\-NF_2\\NH_2\end{smallmatrix}$ | $CH_3C(NF_2)_3$ |

TABLE II—Continued

| | Trifluoroformamidino compound | Ammonia adduct | Tris(difluoramino)-methyl compound |
|---|---|---|---|
| 57 | $CF_3CF_2CF_2C(=NF)NF_2$ | $CF_3CF_2CF_2\underset{NH_2}{\overset{NFH}{C}}-NF_2$ | $CF_3CF_2CF_2C(NF_2)_3$ |
| 58 | $BrC(=NF)NF_2$ | $BrC\underset{NH_2}{\overset{NFH}{-}}NF_2$ | $BrC-(NF_2)_3$ |
| 59 | $N_3C(=NF)NF_2$ | $N_3C\underset{NH_2}{\overset{NFH}{-}}NF_2$ | $N_3C(NF_2)_3$ |
| 60 | $C_6H_5-C(=NF)NF_2$ | $C_6H_5-C\underset{NH_2}{\overset{NFH}{-}}NF_2$ | $C_6H_5-C(NF_2)_3$ |
| 61 | $(C_2H_5OC(O))_2CHC(=NF)NF_2$ | $(C_2H_5OC(O))_2CHC\underset{NH_2}{\overset{NFH}{-}}NF_2$ | $(C_2H_5OC(O))_2CHC(NF_2)_3$ |
| 62 | $C_6H_5SO_2NHOC(=NF)NF_2$ | $C_6H_5SO_2NHOC\underset{NH_2}{\overset{NFH}{-}}NF_2$ | $C_6H_5SO_2NHOC(NF_2)_3$ |
| 63 | indolyl-C(=NF)NF$_2$ | indolyl-$\underset{NF_2}{\overset{H_2N}{C}}-NFH$ | indolyl-C(NF$_2$)$_3$ |
| 64 | $F_2NC(=NF)NF_2$ | $F_2NC\underset{NH_2}{\overset{NFH}{-}}NF_2$ | $HNFC(NF_2)_3$ and $H_2NC(NF_2)_3$ |

Example 65

The following examples demonstrate the conversion of tris(difluoramino)methyl compounds prepared by the above-described methods to give additional compounds of this invention.

To a 20 ml. borosilicate glass reaction flask containing 17.3 mg. of methyl tris(difluoramino)methoxyacetate (0.67 mmole) dissolved in 3.0 ml. of absolute ethanol is added 3.0 ml. of a 3 percent aqueous solution of ammonia (5.3 mmole, 8-fold excess). The reaction mixture is swirled to mix and set aside for 12 hours at room temperature. The volatiles are removed under vacuum at 25°C. to yield a residue of 15.3 milligrams of a white crystalline solid which is stable in air. The solid is found to be ammonium tris(difluoramino)methoxyacetate,

which melts at about 85°C. The fluorine n.m.r. spectrum in acetonitrile shows a single peak at −23.9 φ due to —NF$_2$. A characteristic carbonyl absorption is observed at 6.3 microns in the infrared spectrum, as well as a broad absorption between 10.0 and 11.2 microns due to NF.

Example 66

Approximately 30 milligrams of ammonium tris(difluoramino)methoxyacetate is placed in a tubular reaction flask attached to a high vacuum source and heated in a water bath at 50–60°C. for 3 hours. At the end of this time approximately half of the sample remains in the tube as a slightly discolored solid. In the upper cooler part of the tube both a white amorphous solid and a white crystalline solid are seen to have sublimed away from the original sample. The crystalline solid is found to be tris(difluoramino)methoxyacetamide,

melting at 90–91°C. The carbonyl absorption in the infrared spectrum is found at 6.0 microns.

Example 67

A K$^+$ ion exchange resin is prepared by percolating a dilute methanolic solution of potassium hydroxide over a 1 × 5 cm. bed of an acidic ion exchange resin available under the designation AG 50W-X4, 100–200 mesh from BioRad Laboratory until the eluate is distinctly basic. Ammonium tris(difluoramino)methoxyacetate prepared by the method of Example 65 is converted to potassium tris(difluoramino)methoxyacetate,

by percolating a dilute methanolic solution of the salt over the bed and monitoring samples of the eluate for oxidizing capacity with potassium iodide.

In a typical run, 40.1 milligrams of the ammonium salt yields 36.7 mg. of the potassium salt after evaporation of the solvent under a stream of nitrogen at 40°C.

Employing a Li$^+$ or Na$^+$ ion exchange resin column which is prepared similarly to the above K$^+$ column, the corresponding salts,

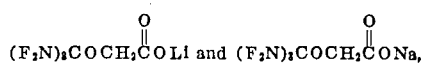

respectively, can be prepared from the ammonium salt.

Example 68

A solution of ammonium tris(difluoramino)methoxyacetate (0.21 millimole) dissolved in absolute methanol is percolated over a 1 × 5 cm. bed of acidic ion exchange resin, AG 50W-X4, 50–100 mesh, to give a high yield of tris(difluoramino)methoxyacetic acid,

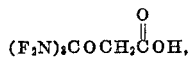

upon evaporation of the eluate. The fluorine n.m.r. spectrum of this compound shows a peak at −23.4 $\phi$. The infrared spectrum contains a carbonyl absorption characteristic of acids at 5.7 microns, as well as the broad absorption in the 10.0 to 11.3 micron region due to NF.

Similarly, the above free acid can be obtained conveniently from its alkali metal salts.

Example 69

To a solution of about 0.09 millimole of potassium tris(difluoramino)methoxyacetate in 4 ml. of absolute methanol is added about 0.09 millimole of the perchlorate salt, $(F_2N)_3COCH_2CH_2NH_3^+ClO_4^-$, dissolved in 1 ml. of absolute methanol. A white precipitate identified as potassium perchlorate is formed. After centrifuging the mixture to remove the salt, the clear methanol solution is decanted and evaporated to yield 2-[tris(difluoramino)methoxy]-ethylamminium tris(difluoramino)methoxyacetate $(F_2N)_3COCH_2CH_2NH_3^+$

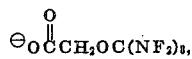

m.p. 83–88°C. The carbonyl absorption appears at 6.0 microns in the infrared spectrum; the NF absorption is complex and is found in the 9.9 to 11.2 micron region.

Example 70

A stirred mixture of 0.5 ml. of concentrated sulfuric acid (95–98 percent) and 0.3 millimole of tris(difluoramino)acetonitrile is heated under autogenous pressure at 80° to 90°C. for 14 hours in a 1.5 ml. borosilicate glass ampoule. Volatile components of the mixture are removed under vacuum to yield a viscous residue having a vapor pressure of less than 2 mm. Hg at 25°C. To the stirred residue cooled to about 0°C. is added 1 ml. of water. The resulting mixture is extracted with several 3 ml. portions of diethyl ether and the combined ether extracts are evaporated to yield tris(difluoramino)acetamide,

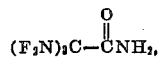

m.p. 103–104°C. The amide shows a fluorine n.m.r. peak at about −30.2 $\phi$ when dissolved in a mixture of ethanol, tetrahydrofuran and CFCl$_3$.

Example 71

To 27 milligrams (0.11 millimole) of tris(difluoramino)methoxyacetic acid dissolved in 2 ml. of absolute methanol is added 4.5 milligrams (0.11 millimole) of magnesium oxide. The mixture is stirred, evaporated to dryness in vacuo at 25°C., re-dissolved in 2 ml. of methanol, and finally centrifuged to remove excess magnesium oxide. Evaporation of the resulting solution gives a quantitative yield of the magnesium salt,

The carbonyl absorption is found at 6.0 microns in the infrared spectrum.

Example 72

A 5 ml. borosilicate glass reactor provided with a polytetrafluoroethylene coated magnetic stirring bar and containing 0.3 millimole of sodium azide is evacuated, cooled to −110°C. and then charged, by means of a vacuum manifold, with 1 ml. of acetonitrile and 0.3 millimole of tris(difluoramino)acetonitrile. The reactor is closed, allowed to warm to room temperature and the mixture is then stirred at room temperature for 2 hours and at 50° to 60°C. for 1 hour. The resulting clear solution is evaporated to give sodium 5-tris(difluoramino)methyltetrazole, a white, ether-insoluble, impact-sensitive solid having a fluorine n.m.r. peak at about −31.8 $\phi$. The infrared spectrum of the compound in mineral oil exhibits a strong, broad absorption in the region between about 10.2 and 11.6 microns, due mainly to the NF bonds of the tris(difluoramino)methyl moiety.

The sodium 5-tris(difluoramino)methyltetrazole thus prepared is dissolved in 0.15 ml. of water and treated with 0.1 ml. of 37 percent aqueous HCl. The mixture (two liquid phases) is extracted with several 2 ml. portions of diethyl ether.

The ether extracts are combined, dried over anhydrous calcium sulfate and evaporated to yield 5-tris(difluoramino)methyltetrazole, having the formula

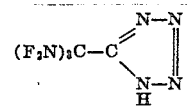

which is a viscous liquid having a vapor pressure of less than about 2 mm. Hg at 25°C. The fluorine n.m.r. spectrum of the compound exhibits a peak at about −31.8 $\phi$. The infrared spectrum shows strong absorptions in the region between 10.4 and 11.6 microns.

We claim:

1. A compound of the formula $$R_B-C(NF_2)_3$$

wherein $R_B$ is a member of the group consisting of polyfluoroalkyl radicals of from one to 18 carbon atoms and hydrocarbon radicals having from one to 30 carbon atoms, said radicals being free from reducing substituents.

2. A compound of the formula $$(NF_2)_3CO-CH_2-CH_2-OC(NF_2)_3$$

3. A compound of the formula $$(NF_2)_3CO-CH_2CH_2OH$$

4. A compound of the formula

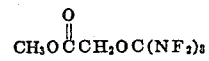

5. A compound of the formula

6. A compound of the formula

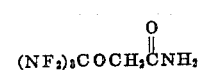

7. A compound of the formula $$(NF_2)_3COCH_2COOH$$

* * * * *